United States Patent Office 2,999,006
Patented Sept. 5, 1961

2,999,006
PROCESS FOR PREPARING SUBSTANTIALLY DRY CRYSTALLINE DIAMMONIUM PHOSPHATE
William A. Hodges, Plant City, Fla., assignor to Swift & Company, Chicago, Ill., a corporation of Illinois
No Drawing. Filed Aug. 22, 1957, Ser. No. 679,779
4 Claims. (Cl. 23—107)

This invention relates generally to fertilizer materials suitable for use on growing plants. More particularly, the invention relates to chemical fertilizer materials which result from the treatment of phosphorous containing materials such as phosphoric acid and mono-ammonium phosphate with ammoniacal materials to yield dry substantially neutral products such as diammonium phosphate which supply high quantities of nitrogen and phosphorous in readily available form.

In the fertilizer industry, one of the most commonly used nitrogen and phosphorous pentoxide sources is diammonium phosphate. Among the advantages of this salt are the high N to $P_2O_5$ ratio (approximately 21–53.8), solubility in water, and its favorable pH in solution (just below 7). Additionally, diammonium phosphate crystals are much finer than are crystals of mono-ammonium phosphate. Thus the material is more easily incorporated into homogeneous plant food formulations and is more easily soluble in water. These advantages are important in economical fertilizer manufacture, and especially is this true in the manufacture of liquid fertilizers.

The use of liquid fertilizers has become increasingly popular in many parts of the country in the last ten years. Liquid fertilizers are defined as essentially neutral aqueous solutions containing dissolved plant nutrients. One of the most preferable general methods for the manufacture of liquid fertilizers is the simple dissolution method which involves merely dissolving the necessary solid-form nutrient sources such as ammonium phosphates in water. As was pointed out above, diammonium phosphate is especially desirable because it is a neutral soluble salt which supplies high quantities of N and $P_2O_5$.

There are, however, several disadvantages incident to the production, and use in fertilizer materials, of diammonium phosphate. It is much more difficult to crystallize from solution than is, for instance, mono-ammonium phosphate. Secondly, currently used methods of preparing diammonium phosphate from the mono-ammonium salt require that the mono-ammonium phosphate be placed in solution or in a slurry prior to ammoniation, again presenting problems of moisture removal from the final product. Further, diammonium phosphate containing approximately 53% $P_2O_5$, is lower in $P_2O_5$ concentration than is commercial phosphoric acid (about 54–55% $P_2O_5$) or mono-ammonium phosphate (about 61% $P_2O_5$). Therefore, shipping charges for diammonium phosphate per unit of $P_2O_5$ are the highest for any $P_2O_5$ producing materials used in fertilizer formulations. Along this line also, is the problem of ammoniating the phosphoric acid and/or mono-ammonium phosphate to diammonium phosphate. Ammonia may be cheaper in the liquid fertilizer consuming areas which are oftentimes far removed from phosphate producing areas, and subsequent shipment to the consumers would involve considerable expense.

It is therefore an object of this invention to provide a process for the economical and efficient production of a chemical source of nitrogen and phosphorous with highly desirable physical properties.

It is a further object of this invention to provide a method for the production of a chemical source of nitrogen and phosphorous in a dry neutral state suitable for use in liquid or solid plant foods.

A still further object of this invention is to provide a method for the production of diammonium phosphate in a dry neutral form which obviates the difficult crystallization and separation of said salt from solution or slurry.

Another object of this invention is to provide for the preparation of dry, neutral diammonium phosphate in a novel stepwise process.

Further objects and advantages, if not specifically set out, will become apparent to one skilled in the art during the course of the following description.

Broadly, this invention relates to the production of mono-ammonium phosphate in phosphate-producing areas and transporting this to the fertilizer consuming areas as a moist crystal. Applicants have found that by ammoniating the moist mono-ammonium phosphate crystals, diammonium phosphate may be prepared in a dry state without need of further processing. Alternately, mono-ammonium crystals may be produced and shipped in a dry state, and then moistened prior to ammoniation to produce the dry diammonium salt. The $P_2O_5$ is thus shipped in one of its most concentrated commercial forms and fixed in solid form with a minimum of ammonia. Mono-ammonium phosphate is not corrosive. Therefore shipping costs are lessened, no expensive storage equipment is necessary, and the neutralization to diammonium phosphate does not require acid resistant material.

More particularly, this invention relates to production of mono-ammonium phosphate analyzing about 12% nitrogen and 61% available $P_2O_5$ in phosphate producing areas. This salt is readily crystallizable and is processed through a centrifuge to remove the free water. Thus, phosphoric acid is fixed in solid form with a minimum of ammonia and may be transported as a dry or moist salt to areas where ammonia is cheaper than in areas where the phosphoric acid is produced, and the ammoniation completed at a lower cost.

The moist mono-ammonium phosphate crystals, containing from 10 to 15% moisture, may be ammoniated with anhydrous ammonia to produce a substantially dry diammonium phosphate in any relatively uncomplicated apparatus in which a very thorough mixing operation may be obtained. No further processing is necessary or desirable and the diammonium phosphate is suitable to be mixed with other ingredients in liquid or dry formulations.

In experimental procedures, a small laboratory model planetary mixer was found satisfactory. For purposes of these procedures, the bowl of the mixer was equipped with a small (⅛″) inlet pipe in the bottom thereof in order that the reactant medium, in this case gaseous anhydrous ammonia, might be introduced beneath the bed of the material being processed. A planetary mixer is described in Perry's Handbook of Chemical Engineering as follows:

"*Planetary mixer.*—A mixer in which a paddle rotates on a shaft which is located off center of the kettle or container, and at the same time, the shaft revolves around the center or axis of the kettle. This planetary motion causes the action to visit every portion of the kettle in turn, giving thorough local mixing and carrying particles forward in overlapping cycloidal paths, thereby producing intermixing."

The examples are set out solely for purposes of illustration and are not intended to restrict the scope of the invention other than is indicated in the appended claims.

EXAMPLE I 1000 grams of mono-ammonium phosphate analyzing approximately 12% nitrogen and 61% $P_2O_5$ and containing approximately 15% moisture was placed in the bowl of a small planetary mixer and agitation started. Gaseous anhydrous ammonia was introduced at a rate that would keep ammonia losses to a minimum. Ammoniation was continued until the product was dry and powdery, a period of about 15 minutes. The maximum temperature reached during the reaction was about 225° F. The processed diammonium phosphate passed 95% through a 20 mesh screen and analyzed 20.46% nitrogen and 53.94% $P_2O_5$.

EXAMPLE II

A second 1000 gram sample of mono-ammonium phosphate was processed as in Example I and analyzed 21.23% nitrogen and 52.32% $P_2O_5$.

EXAMPLE III 655 grams of mono-ammonium phosphate analyzing 12% N and 61% $P_2O_5$ was placed in the bowl of a planetary mixer with 655 grams of muriate of potash analyzing 61% $K_2O$, 98 grams of ammonium sulfate analyzing 21.5 N, and 90 ml. of water, enough to merely moisten the dry ingredients. Agitation was started and the mixture was ammoniated with 95 grams of gaseous anhydrous ammonia analyzing 82.25% N. The resultant mixture was dry and powdery. 497 grams of urea analyzing 45% N was added and the mixing was continued until a homogeneous mixture was obtained. Analysis of the finished product compared with the theoretical analysis as follows:

*Table 1*

| Ingredient | Theoretical Analysis (percent) | Actual Analysis (percent) |
|---|---|---|
| N | 20.07 | 20.50 |
| $P_2O_5$ | 19.98 | 20.81 |
| $K_2O$ | 19.98 | 20.18 |

It is evident from the foregoing that it is possible by the application of the teachings of this invention to produce diammonium phosphate in a dry, crystalline state from moist crystals of mono-ammonium phosphate. This dry crystalline salt may be readily incorporated into homogeneous plant food formulations and may just as readily be put into solution to produce liquid fertilizer products. It is equally possible to mix the moist mono-ammonium phosphate with additional fertilizer ingredients prior to final ammoniation to produce a high analysis plant food mixture.

Obviously, many modifications and variations of the invention as hereinbefore set forth may be made without departing from the spirit and scope thereof, and therefore only such limitations should be imposed as are indicated in the appended claims.

I claim:

1. A process for preparation of substantially dry crystalline diammonium phosphate comprising: partially neutralizing phosphoric acid with ammonia to produce mono-ammonium phosphate; preparing a moist crystalline product of said mono-ammonium phosphate, said product containing from about 10 to 15% moisture; and further ammoniating said moist crystalline product with anhydrous ammonia to produce without further processing substantially dry crystalline diammonium phosphate.

2. A process for preparation of solid substantially dry diammonium phosphate crystals comprising: partially neutralizing phosphoric acid with ammonia to produce mono-ammonium phosphate; reducing the moisture content of said mono-ammonium phosphate to from about 10 to about 15%; and reacting the mono-ammonium phosphate with anhydrous ammonia, whereby is produced without further processing solid, substantially dry diammonium phosphate crystals.

3. A process for preparation of solid substantially dry diammonium phosphate crystals comprising: preparing a moist crystalline product of mono-ammonium phosphate, said product containing from about 10 to 15% moisture, and reacting said product with sufficient anhydrous ammonia to produce without further processing solid, substantially dry diammonium phosphate crystals.

4. A process for preparation of substantially dry crystalline diammonium phosphate comprising: preparing a moist crystalline product of mono-ammonium phosphate, said product containing from about 10 to 15 percent moisture and reacting about 7 parts by weight of said product with about 1 part by weight gaseous anhydrous ammonia to produce without further processing substantially dry crystalline diammonium phosphate.

References Cited in the file of this patent

UNITED STATES PATENTS

| | | |
|---|---|---|
| 1,716,415 | Buchanan | June 11, 1929 |
| 1,785,375 | Buchanan | Dec. 16, 1930 |
| 1,822,040 | Klugh et al. | Sept. 8, 1931 |
| 1,866,564 | Hansen | July 12, 1932 |
| 1,869,879 | Balz et al. | Aug. 2, 1932 |
| 1,980,008 | Shoeld | Nov. 6, 1934 |
| 2,040,563 | Phillips | May 12, 1936 |